United States Patent
Heinks et al.

(10) Patent No.: US 12,476,538 B2
(45) Date of Patent: Nov. 18, 2025

(54) DEVICE WITH SWITCHED CAPACITOR CHARGE PUMP SENSING CIRCUITRY

(71) Applicant: Medtronic, Inc., Minneapolis, MN (US)

(72) Inventors: Michael W. Heinks, New Brighton, MN (US); Michael B. Terry, Camas, WA (US); Emily Carroll, St. Paul, MN (US)

(73) Assignee: Medtronic, Inc., Minneapolis, MN (US)

( * ) Notice: Subject to any disclaimer, the term of this patent is extended or adjusted under 35 U.S.C. 154(b) by 923 days.

(21) Appl. No.: 17/644,735

(22) Filed: Dec. 16, 2021

(65) Prior Publication Data

US 2022/0200448 A1 Jun. 23, 2022

Related U.S. Application Data

(60) Provisional application No. 63/127,366, filed on Dec. 18, 2020.

(51) Int. Cl.
*H02M 3/07* (2006.01)
*A61N 1/365* (2006.01)
*G01R 33/54* (2006.01)

(52) U.S. Cl.
CPC .............. *H02M 3/07* (2013.01); *A61N 1/365* (2013.01); *G01R 33/54* (2013.01)

(58) Field of Classification Search
CPC ..... H02M 3/07; A61N 1/365; A61N 1/37211; A61N 1/3756; A61N 1/3704; A61B 5/308; A61B 5/72

(Continued)

(56) References Cited

U.S. PATENT DOCUMENTS

| 4,913,145 A | 4/1990 | Stotts |
| 5,103,819 A * | 4/1992 | Baker ...................... A61N 1/37 607/9 |

(Continued)

FOREIGN PATENT DOCUMENTS

| CN | 106374738 A * | 2/2017 | ............ H02M 3/073 |
| CN | 106374738 B | 2/2019 | |

(Continued)

OTHER PUBLICATIONS

Atzeni et al., "A 0.45/0.2-NEF/PEF 12-nV/Hz Highly Configurable Discrete-Time Low-Noise Amplifier", IEEE Solid-State Circuits Letters, vol. 3, Oct. 26, 2020, pp. 486-489, DOI: 10.1109/LSSC.2020.3029016.

(Continued)

*Primary Examiner* — Carl H Layno
*Assistant Examiner* — Mary Grace Schlueter
(74) *Attorney, Agent, or Firm* — Shumaker & Sieffert, P.A.

(57) ABSTRACT

An example device includes a memory configured to store representations of sensed signals. The example device includes processing circuitry coupled to the memory, the processing circuitry being configured to read or write the representations of the sensed signals in the memory. The example device includes sensing circuitry coupled to the processing circuitry, the sensing circuitry being configured to sense signals indicative of a physiological condition of a patient via a plurality of electrodes and to output to the processor circuitry the representations of the sensed signals. The sensing circuitry includes a switched capacitor charge pump configured to amplify the sensed signals to generate amplified signals.

16 Claims, 6 Drawing Sheets

(58) Field of Classification Search
USPC .......................................................... 607/9
See application file for complete search history.

(56) References Cited

U.S. PATENT DOCUMENTS

| | | | |
|---|---|---|---|
| 5,255,186 A * | 10/1993 | Steinhaus | A61B 5/35 |
| | | | 600/521 |
| 5,690,683 A | 11/1997 | Haefner et al. | |
| 6,892,096 B2 | 5/2005 | Lyden | |
| 7,135,910 B2 | 11/2006 | Cernea | |
| 8,339,184 B2 | 12/2012 | Kok et al. | |
| 10,110,130 B2 | 10/2018 | Salem | |
| 10,128,745 B2 | 11/2018 | Low et al. | |
| 10,284,099 B2 | 5/2019 | Zhang et al. | |
| 10,340,794 B1 | 7/2019 | Zhang et al. | |
| 10,374,512 B2 | 8/2019 | Szczeszynski et al. | |
| 2004/0061548 A1 | 4/2004 | Cernea | |
| 2005/0075677 A1 | 4/2005 | Ganion et al. | |
| 2009/0312815 A1 * | 12/2009 | Hopper | A61N 1/3627 |
| | | | 607/19 |
| 2012/0053470 A1 | 3/2012 | Louis et al. | |
| 2018/0205315 A1 | 7/2018 | Giuliano et al. | |
| 2019/0089258 A1 | 3/2019 | Giuliano et al. | |
| 2019/0190376 A1 | 6/2019 | Xiong et al. | |
| 2019/0238053 A1 * | 8/2019 | Oliva | H02J 50/001 |
| 2020/0099290 A1 | 3/2020 | Szczeszynski | |
| 2020/0405168 A1 * | 12/2020 | Gabrin | A61B 5/346 |

FOREIGN PATENT DOCUMENTS

| | | | | |
|---|---|---|---|---|
| EP | 0568197 A2 | 3/1993 | | |
| EP | 0568198 A2 | 3/1993 | | |
| WO | WO-2009157911 A1 * | 12/2009 | | A61N 1/378 |
| WO | 2017210340 A1 | 12/2017 | | |

OTHER PUBLICATIONS

Hall et al., "Quantifying Biomedical Amplifier Efficiency", IEEE Solid-State Circuits Magazine, vol. 15, No. 2, IEEE, Jun. 20, 2023, pp. 28-33, DOI: 10.1109/MSSC.2023.3256353.

International Preliminary Report on Patentability from International Application No. PCT/US2021/064178 dated Jun. 29, 2023, 8 pp.

Bendaoud et al., "Study and Analysis of Charge Pump Circuits and Inductor Based DC-DC Converters for Mobile Applications," International Journal of Engineering, Science, and Mathematics, vol. 7, Issue 3, Dec. 2018, 14 pp.

Cabrini et al., "Voltage Gain Analysis of Integrated Fibonacci-Like Charge Pumps for Low Power Applications," IEEE Transactions on Circuits and Systems-II: Express Briefs, vol. 54, No. 11, Nov. 2007, pp. 929-933.

International Search Report and Written Opinion of International Application No. PCT/US2021/064178, dated Apr. 4, 2022, 12 pp.

Lin et al., "High-Current Drivability Fibonacci Charge Pump With Connect-Point-Shift Enhancement," IEEE Transactions on Very Large Scale Integration (VLSI) Systems, vol. 24, No. 7, Jul. 2017, pp. 2164-2173.

Matousek et al., "New Discrete Fibonacci Charge Pump Design, Evaluation and Measurement," Measurement Science Review, vol. 17, No. 3, ISSN: 1335-8871, Jun. 14, 2017, pp. 100-107.

Oliva et al., "General Analysis of Fibonacci Charge Pump SSL Output Characteristics With Parasitic Capacitances," IEEE Transactions on Power Electronics, vol. 34, No. 9, Sep. 2019, pp. 8274-8278.

Starzyk et al., "A DC-DC Charge Pump Design Based on Voltage Doublers," IEEE Transactions on Circuits and Systems-I: Fundamental Theory and Applications, vol. 48, No. 3, Mar. 2001, pp. 350-359.

Jeno et al., "Emergency Power Supply for Small Computer Systems," In Proceedings of the IEEE International Symposium on Circuits and Systems, Singapore, Jun. 11-14, 1991, pp. 1065-1068.

Wong et al., "Practical Design Strategy for Two-phase Step up DC-DC Fibonacci Switched-Capacitor Converter," 20th European Conference on Circuit Theory and Design (ECCTD), Aug. 2011, pp. 817-820.

Communication pursuant to Article 94(3) EPC from counterpart European Application No. 21844514.6 dated Mar. 18, 2025, 7 pp.

* cited by examiner

DEVICE WITH SWITCHED CAPACITOR CHARGE PUMP SENSING CIRCUITRY

This application claims the benefit of U.S. Provisional Application No. 63/127,366, filed Dec. 18, 2020, and entitled "DEVICE WITH SWITCHED CAPACITOR CHARGE PUMP SENSING CIRCUITRY," the entire content of which is incorporated by reference herein.

TECHNICAL FIELD

The disclosure relates to a device having sensing circuitry, and more particularly, to a device having switched capacitor charge pump sensing circuitry.

BACKGROUND

Some devices, including medical devices, include sensing circuitry that may be used to sense low frequency signals, such as signals indicative of physiological condition of a patient. For example, a medical device such as a pacing device may not only deliver pacing pulses to a patient's heart, but may also sense and monitor conditions of the patient's heart. The pacing device may be an implantable medical device (IMD) and may include a pulse generator and one or more electrical leads or electrodes.

The pulse generator may be implanted in a small pocket in the patient's chest in some examples. The electrical leads or electrodes may be coupled to the pulse generator, which may contain circuitry that generates pacing pulses and/or senses cardiac electrical activity. The electrical leads or electrodes may extend from the pulse generator to a target site (e.g., an atrium and/or a ventricle) where electrodes at the distal ends of the electrical leads (or the electrodes themselves) connect to the target site. The pulse generator may provide electrical stimulation to the target site and/or monitor cardiac electrical activity at the target site via the electrodes.

In some examples, a pacing device is configured such that the pulse generator may be implanted entirely within the vasculature of the patient, such as entirely within a chamber of the heart, and may include electrodes formed integral with its housing rather than leads. Additionally, medical devices other than pacing devices may include sensing circuitry that may be used to sense low frequency signals. Examples include implanted or external physiological monitoring devices and neurostimulators.

SUMMARY

A device of the present disclosure includes sensing circuitry for low frequency signals, such as signals indicative of a physiological condition of a patient. The sensing circuitry includes a switched capacitor charge pump configured to amplify sensed signals to generate amplified signals. The switched capacitor charge pump may include a plurality of passive devices and a plurality of passive switches. The switched capacitor charge pump may draw less current than a traditional active amplifier as the switched capacitor charge pump may refrain from using a fixed bias current. The switched capacitor charge pump may be a low noise circuit and may reduce noise contribution by the sensing circuitry. In some examples, the switched capacitor charge pump may be a Fibonacci series charge pump.

In some examples, the device may be an implantable medical device (IMD). In some examples, the device may be a cardiac pacing device, such as atrial cardiac pacing device, and the sensing circuitry may be configured to sense a condition of the heart of a patient. The atrial cardiac pacing device may be configured for implantation within the atrium of a patient's heart. The atrial device may pace the atrium and sense intrinsic atrial electrical activity, and detect ventricular activation. The atrial device may be configured to detect ventricular activation by detecting ventricular electrical activity and/or mechanical contraction of the ventricles. In some examples, the atrial device may control the timing of pacing pulses delivered to the atrium based on when ventricular activation is detected.

In some examples, a device according to the present disclosure includes: memory configured to store representations of sensed signals; processing circuitry coupled to the memory, the processing circuitry being configured to read or write the representations of the sensed signals in the memory; and sensing circuitry coupled to the processing circuitry, the sensing circuitry being configured to sense signals indicative of a physiological condition of a patient via a plurality of electrodes and to output to the processor circuitry the representations of the sensed signals, wherein the sensing circuitry comprises a switched capacitor charge pump configured to amplify the sensed signals to generate amplified signals.

In some examples, a method according to the present disclosure includes: sensing, via electrodes, signals indicative of a physiological condition of a patient; amplifying, by a switched capacitor charge pump, the signals indicative of the physiological condition of the patient to generate amplified signals; and storing, by processing circuitry, representations of the sensed signals in a memory.

In some examples, a device according to the present disclosure includes: memory configured to store representations of sensed signals; processing circuitry coupled to the memory, the processing circuitry being configured to read or write the representations of the sensed signals in the memory; and sensing circuitry coupled to the processing circuitry, the sensing circuitry being configured to sense low frequency signals via a plurality of electrodes and to output to the processor circuitry the representations of the sensed signals, wherein the sensing circuitry comprises a switched capacitor charge pump configured to amplify the sensed signals to generate amplified signals.

The details of one or more examples are set forth in the accompanying drawings and the description below. Other features, objects, and advantages will be apparent from the description and drawings, and from the claims.

DETAILED DESCRIPTION

Devices may have sensing circuitry for sensing low frequency signals (e.g., signals generally in the range of 0.5 Hz to 250 Hz), such as bio-electrical activity or signals indicative of a physiological condition of a patient. For example, implantable medical devices (IMDs), such as cardiac pacing devices, that monitor cardiac activity, have sensing circuitry that interface with electrical leads or electrodes. The sensing circuitry may include amplification and filtering. Amplification may be included to improve a signal-to-noise ratio to allow the cardiac signal to be sensed reliably. For example, noise may interfere with accurate sensing of the cardiac signal.

Some devices used to sense a physiological condition of a patient include a low noise preamplifier at the front end of the sensing channel. This implementation may result in lower overall noise because any noise in the subsequent circuits, such as thermal noise and the quantization noise of analog to digital converters, is reduced in proportion to the input signal by the gain of the preamplifier. This results in the preamplifier noise dominating the overall noise performance.

Low noise amplifiers often use active devices which require a constant bias current. The use of a constant bias current in a device may be undesirable as the constant bias current may negatively affect, not only a discharge rate of a battery powering the device, requiring more frequent recharging or shorter service life for non-rechargeable batteries. In the example of an IMD, this may lead to an earlier replacement of the IMD.

Instead of a device having an active preamplifier, according to the techniques of this disclosure, the device may have a switched capacitor charge pump. A switched capacitor charge pump may provide gain to the sensed signal to lower the noise floor without the need for a constant bias current which may more quickly drain a battery powering an IMD, such as a cardiac pacing device. Rather than having a fixed bias current, the switched capacitor charge pump may use all passive devices and switches. In this manner, the current consumption of the gain stage of the sensing circuitry is limited to passive switching currents, thereby decreasing battery drain. Additionally, the switched capacitor charge pump may be a low noise circuit that may reduce the noise component of the sensing circuitry when compared to sensing circuitry using an active preamplifier.

While the examples of a device presented herein are focused on an atrial cardiac pacing device, the techniques of this disclosure may be used on any device configured to sense low frequency signals, such as signals indicative of a physiological condition of a patient. For example, the techniques of this disclosure may be applicable to an insertable cardiac monitor, implantable neurostimulation device, or other device capable of sensing low frequency signals, which need not be physiological.

In some examples, the device of the present disclosure may be an IMD, such as an atrial pacing device (hereinafter "atrial device") configured for implantation within the atrium of a patient's heart. The atrial device may pace the atrium, sense intrinsic atrial electrical activity, and detect ventricular activation. The atrial device may control the timing of pacing pulses delivered to the atrium based on the detected ventricular activity.

The atrial device may include a hermetically sealed housing having a size and form factor that allows the atrial device to be implanted within the atrium. In some examples, the housing may have a cylindrical (e.g., pill-shaped) form factor. The housing may include fixation tines that connect the housing to the cardiac tissue within the atrium. The fixation tines may anchor the atrial device to the atrial cardiac tissue such that the atrial device moves along with the atrial cardiac tissue during cardiac contractions.

The housing of the atrial device may house components for sensing cardiac electrical activity such as intrinsic atrial depolarizations and ventricular depolarizations, e.g., far-field R-waves (FFRWs). The atrial device may also house components for delivering electrical stimulation therapy, such as pacing pulses. In some examples, the atrial device may also house components for sensing other physiological parameters, such as acceleration, pressure, sound, and/or impedance. Although described primarily in the context of an atrial device, the techniques may be similarly applicable to a ventricular pacing device or a device configured to sense cardiac activity from any other implanted or external location. In such examples, the sensed depolarizations may be near-field and/or far-field.

The atrial device may include a plurality of electrical leads or electrodes used for sensing cardiac electrical activity and delivering electrical stimulation therapy (e.g., pacing pulses). For example, the atrial device may include a tip electrode and a ring electrode. The tip electrode may be located on the housing such that the tip electrode contacts the cardiac tissue when the atrial device is anchored to the cardiac tissue by the fixation tines. The ring electrode may also be located on the housing. For example, the ring electrode may be disposed around the circumference of the housing.

The atrial device may be configured to detect ventricular activation events. Ventricular activation may generally refer to electrical depolarization of the ventricular cardiac tissue and the subsequent mechanical contraction of the ventricular cardiac tissue. The atrial device may be configured to detect ventricular activation based on the detection of ventricular electrical activity and/or based on the detection of mechanical contraction of the ventricles. As used herein, detection of ventricular activation may generally refer to the detection of ventricular electrical activity (e.g., FFRWs) and/or the detection of mechanical contraction of the ventricles (e.g., based on heart sounds). In some examples, the atrial device may detect ventricular activation by detecting FFRWs. In some examples, the atrial device may detect ventricular activation by detecting S1 heart sounds. Although the atrial device may detect ventricular activation based on FFRWs and/or heart sounds, it is contemplated that the atrial device may detect ventricular activation using other sensors and techniques.

In some examples, the atrial device may detect FFRWs in the atrium which are indicative of a ventricular depolarization. For example, the atrial device may detect FFRWs and determine when ventricular depolarization has occurred based on the detection of FFRWs. Although the atrial device is described herein as detecting ventricular depolarization based on the detection of FFRWs, it is contemplated that the atrial device may detect ventricular depolarization based on detected ventricular electrical activity other than FFRWs.

Additionally, or alternatively, the atrial device may be configured to detect mechanical contraction of the ventricles. For example, the atrial device may detect physiological parameters other than cardiac electrical activity, such as acceleration and/or pressure. In some examples, the atrial device may include one or more sensors that measure acceleration and/or pressure in the atrium. In these examples, the atrial device may detect mechanical contraction of the ventricles based on signals generated by the one or more sensors.

The atrial device may include an electrical sensing circuitry (e.g., sensing circuitry) that is configured to monitor cardiac electrical activity in the atrium. The sensing circuitry may include electronic components that acquire cardiac electrical signals via the electrodes of the atrial device (e.g., the tip and ring electrodes) or via electrodes coupled to electrical leads. In some examples, the sensing circuitry may implement signal conditioning on the acquired electrical signals. For example, the sensing circuitry may amplify, filter, and digitize the acquired electrical signals. The electrical activity monitored by the sensing circuitry may include a variety of different electrical signal components. The electrical activity may include intrinsic cardiac electrical activity, e.g., intrinsic atrial activity and/or intrinsic ventricular electrical activity, or other electrical signals.

The atrial device may include one or more sensors, such as an accelerometer and/or a pressure sensor. An accelerometer included in the atrial device may generate signals that indicate the acceleration of the atrial device. A pressure sensor included in the atrial device may generate signals that indicate pressure within the atrium. When the atrial device includes a pressure sensor or an accelerometer, the atrial device may detect ventricular activation based on signals generated by the sensors.

The atrial device may include a stimulation generator circuitry (i.e., "stimulation generator") that is configured to deliver electrical stimulation to the atrium via the electrodes (e.g., the tip and ring electrodes). For example, the atrial device may deliver pacing pulses to the atrium via the electrodes. In some examples, the atrial device may deliver electrical stimulation other than bradycardia pacing, such as anti-tachycardia pacing (ATP) therapy.

The atrial device may include processing circuitry that receives sensing data from the sensing circuitry. The data received from the sensing circuitry may include digitized electrical activity that was received via the electrodes of the atrial device. The processing circuitry may detect intrinsic atrial activity based on the sensing data received from the sensing circuitry. For example, the processing circuitry may detect an intrinsic atrial depolarization based on the sensing data received from the sensing circuitry. Detection of intrinsic atrial depolarization by the processing circuitry may be referred to as an "atrial sensed event" or a "sensed atrial event" in some examples. Atrial electrical activity that is precipitated by delivery of a pacing pulse from the stimulation generator may be referred to as an "atrial paced event."

The processing circuitry may detect ventricular activation events in a variety of different ways. In some examples, the processing circuitry may detect ventricular electrical activity (e.g., FFRWs). In some examples, the processing circuitry may detect ventricular contraction based on signals received from the one or more sensors included in the atrial device.

As described above, the processing circuitry may detect ventricular activation based on the detection of ventricular electrical activity (e.g., FFRWs). In some examples, the processing circuitry may detect ventricular activation based only on detected ventricular electrical activity. In other examples, the processing circuitry may detect ventricular activation based only on the detection of ventricular contractions, e.g., based only on accelerometer data and/or pressure data. In still other examples, the processing circuitry may detect ventricular activation based on a combination of both ventricular electrical activity and detected ventricular contractions.

The processing circuitry may control when the stimulation generator delivers pacing pulses (i.e., atrial pacing timing) based on when the processing circuitry detects ventricular activation during a cardiac cycle. For example, the processing circuitry may first determine an amount of time between a ventricular activation event and a previous atrial event (e.g., an intrinsic or paced atrial event) that preceded the detected ventricular activation event. Then, the processing circuitry may schedule a time at which to deliver a pacing pulse to the atrium based on the determined amount of time between the ventricular activation event and the previous atrial event. The processing circuitry may then control the signal generator circuitry to deliver the pacing pulse to the atrium at the scheduled time. In some examples, the processing circuitry may be configured to inhibit delivery of a pacing pulse at the scheduled time if the processing circuitry senses an intrinsic atrial depolarization before the scheduled time at which the pacing pulse was to be delivered.

The processing circuitry may control atrial pacing timing based on the detection of ventricular activation in a variety of different ways. The manner in which the processing circuitry controls atrial pacing timing may depend on when ventricular activation occurs relative to the atrial event that preceded (e.g., precipitated) the ventricular activation. For example, the manner in which the processing circuitry controls atrial pacing timing may depend on when a FFRW is sensed relative to the atrial event that preceded the FFRW.

Figure 1:
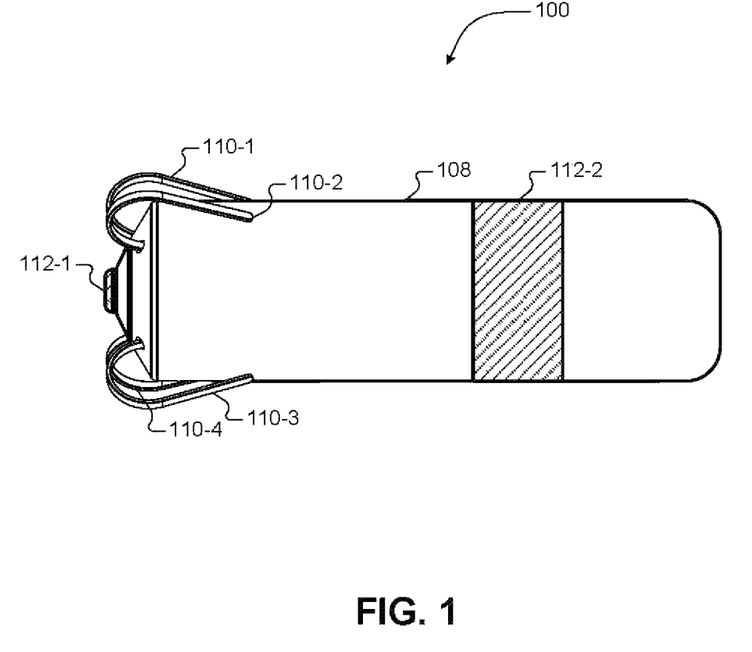
FIG. 1 is a conceptual diagram illustrating an example pacing device.
Figure 3:
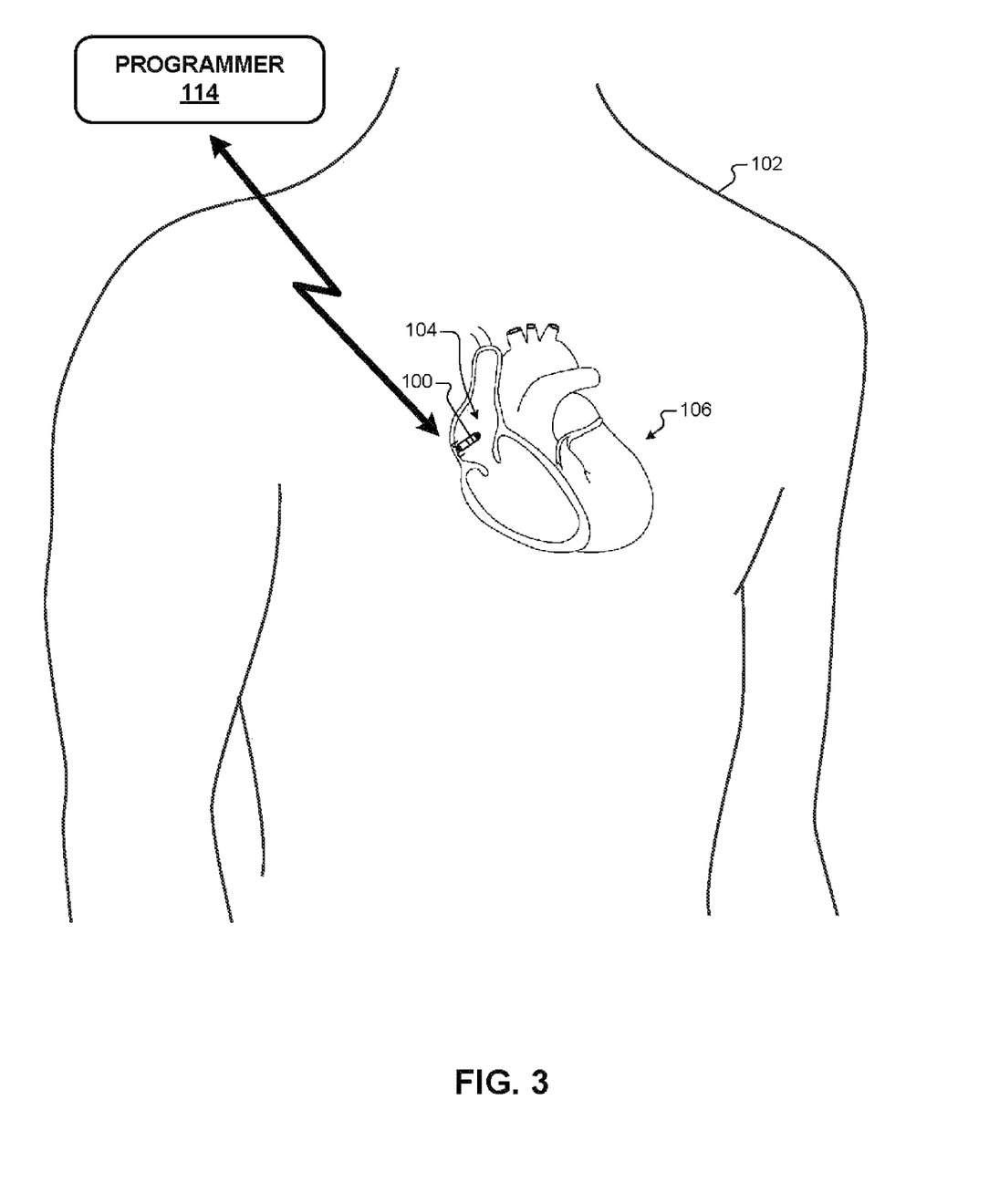
FIG. 3 is a conceptual diagram illustrating an example pacing device implanted in a patient that may be used to diagnose conditions of and provide therapy to a heart of the patient.

FIG. 1 shows an IMD, atrial cardiac pacing device (hereinafter "atrial device 100"), that may be configured for implantation in a patient 102 (FIG. 3). For example, atrial device 100 may be configured for implantation within right atrium 104 of patient 102. Atrial device 100 may be configured to sense and monitor electrical activity of heart 106 and/or provide electrical therapy to heart 106.

Atrial device 100 includes a housing 108, fixation tines 110-1, 110-2, 110-3, 110-4 (collectively "fixation tines 110"), and electrodes 112-1, 112-2. Housing 108 may have a pill-shaped cylindrical form factor in some examples. Fixation tines 110 are configured to connect (e.g., anchor) atrial device 100 to heart 106. Fixation tines 110 may be fabricated from a shape memory material, such as Nitinol. In some examples, fixation tines 110 may connect atrial device 100 to heart 106 within one of the chambers of heart 106. For example, as illustrated and described herein with respect to FIG. 3, fixation tines 110 may be configured to anchor atrial device 100 to heart 106 within right atrium 104. Although atrial device 100 includes a plurality of fixation tines 110 that are configured to anchor atrial device 100 to cardiac tissue in the right atrium, it is contemplated that an atrial device according to the present disclosure may be fixed to cardiac tissue in other chambers of a patient's heart using other types of fixation mechanisms.

Atrial device 100 may include one or more electrodes 112 for sensing electrical activity of heart 106 and/or delivering electrical stimulation to heart 106. Atrial device 100 includes two electrodes 112, although more than two electrodes may be included on an atrial device in other examples. Electrode 112-1 may be referred to as "tip electrode 112-1." Electrode 112-2 may be referred to as a "ring electrode 112-2." In some examples, atrial device may include leads between housing 108 and electrodes. Fixation tines 110 may anchor atrial device 100 to cardiac tissue such that tip electrode 112-1 maintains contact with the cardiac tissue. Ring electrode 112-2 may be located on housing 108. For example, ring electrode 112-2 may be a cylindrical electrode that wraps around housing 108. Although ring electrode 112-2 is illustrated as a cylindrical electrode that wraps around housing 108, ring electrode 112-2 may include other geometries. In some examples, housing 108 may be formed from a conductive material. In these examples, housing 108 may act as an electrode of atrial device 100. In some examples, housing 108 may be formed from a conductive material and coated with an insulative material. In such examples, removal of the insulative material from a portion of housing 108 may allow the uninsulated portion to function as electrode 112-2, which may have the illustrated ring-like shape or another shape.

Housing 108 houses electronic components of atrial device 100. Electronic components may include any discrete and/or integrated electronic circuit components that implement analog and/or digital circuits capable of producing the functions attributed to atrial device 100 described herein. For example, housing 108 may house electronic components that sense electrical activity via electrodes 112 and/or deliver electrical stimulation via electrodes 112. Additionally, housing 108 may also include memory that includes instructions that, when executed by one or more processing circuits housed within housing 108, cause atrial device 100 to perform various functions attributed to atrial device 100 herein. Housing 108 may also house sensors that sense physiological conditions of patient 102, such as an accelerometer and/or a pressure sensor.

In some examples, housing 108 may house a communication circuitry that enables atrial device 100 to communicate with other electronic devices, such as programmer 114 or other external patient monitor. In some examples, housing 108 may house an antenna for wireless communication. Housing 108 may also include a power source, such as a battery. Electronic components included within housing are described in further detail hereinafter.

Figure 2:
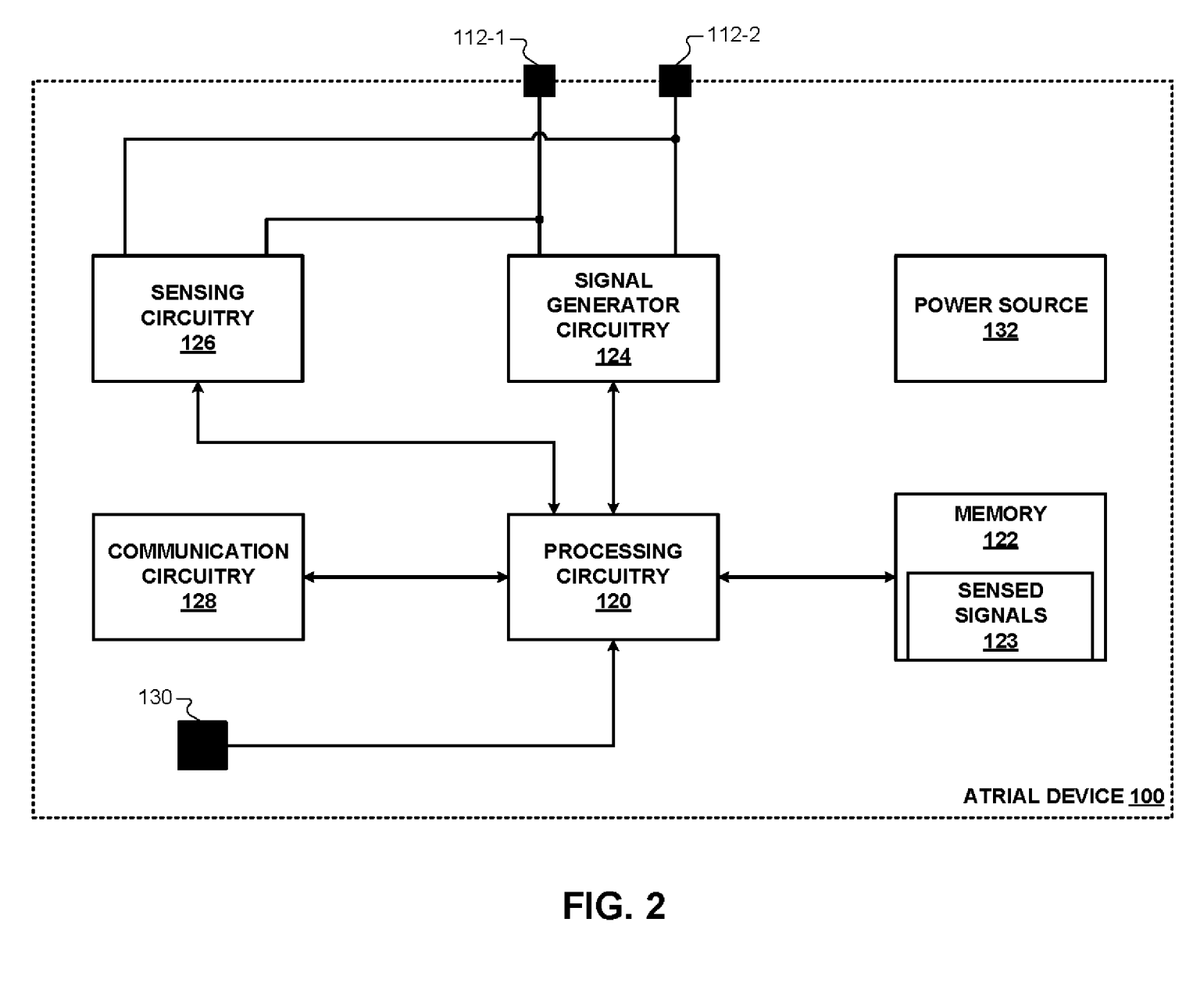
FIG. 2 is a functional block diagram illustrating the example pacing device.

FIG. 2 shows a functional block diagram of an example atrial device 100 configured for implantation within right atrium 104 (FIG. 3). FIG. 3 shows a therapy system including atrial device 100 and programmer 114 that may be used to program atrial device 100 and retrieve data from atrial device 100. Atrial device 100 includes a processing circuitry 120, memory 122, signal generator circuitry 124, sensing circuitry 126, communication circuitry 128, a sensor 130, and a power source 132. Power source 132 may include a battery, e.g., a rechargeable or non-rechargeable battery.

Circuitry included in atrial device 100 represent functionality that may be included in atrial device 100 of the present disclosure. Circuitry of the present disclosure may include any discrete and/or integrated electronic circuit components that implement analog and/or digital circuits capable of producing the functions attributed to the circuitry herein. For example, the circuitry may include analog circuits, e.g., amplification circuits, filtering circuits, and/or other signal conditioning circuits. The circuitry may also include digital circuits, e.g., combinational or sequential logic circuits, memory devices, etc. Memory may include any volatile, non-volatile, magnetic, or electrical media, such as a random access memory (RAM), read-only memory (ROM), non-volatile RAM (NVRAM), electrically-erasable programmable ROM (EEPROM), Flash memory, or any other memory device. Furthermore, memory may include instructions that, when executed by one or more processing circuits, cause the circuitry to perform various functions attributed to the circuitry herein.

The functions attributed to the circuitry herein may be embodied as one or more processors, hardware, firmware, software, or any combination thereof. Depiction of different features as circuitry is intended to highlight different functional aspects, and does not necessarily imply that such circuitry must be realized by separate hardware or software components. Rather, functionality associated with one or more circuitry may be performed by separate hardware or software components, or integrated within common or separate hardware or software components.

Processing circuitry 120 may communicate with memory 122. Processing circuitry 120 may include any one or more of a microprocessor, a controller, a digital signal processor (DSP), an application specific integrated circuit (ASIC), a field-programmable gate array (FPGA), or equivalent discrete logic circuitry. In some examples, processing circuitry 120 may include multiple components, such as any combination of one or more microprocessors, one or more controllers, one or more DSPs, one or more ASICs, or one or more FPGAs, as well as other discrete or integrated logic circuitry. The functions attributed to processing circuitry 120 herein may be embodied as software, firmware, hardware or any combination thereof.

Memory 122 may include computer-readable instructions that, when executed by processing circuitry 120, cause processing circuitry 120 to perform the various functions attributed to processing circuitry 120 herein. Memory 122 may include any volatile, non-volatile, magnetic, or electrical media, such as RAM, ROM, NVRAM, EEPROM, Flash memory, or any other digital media. For example, memory 122 may include pacing instructions and values, such as the baseline atrial pacing rate, the baseline atrial pacing interval and the baseline AV interval. The pacing instructions and values may be updated by programmer 114 (FIG. 3). Additionally, memory 122 may include representations of sensed signals 123 sensed by sensing circuitry 126. These representations of sensed signals 123 may be amplified, filtered and analog to digital converted representations of the sensed signals. In some examples, the representations of sensed signals 123 may be amplified, filtered, analog to digital converted and digitally signal processed representations of the sensed signals.

Processing circuitry 120 may communicate with signal generator circuitry 124 and sensing circuitry 126. Signal generator circuitry 124 and sensing circuitry 126 are electrically coupled to electrodes 112. Sensing circuitry 126 is configured to sense signals from electrodes 112 (or other electrodes via leads) in order to monitor electrical activity of heart 106. Signal generator circuitry 124 is configured to deliver electrical stimulation to right atrium 104 via electrodes 112.

Processing circuitry 120 may control signal generator circuitry 124 to generate and deliver electrical stimulation to right atrium 104 via electrodes 112 (or other electrodes via leads). Electrical stimulation may include pacing pulses. In some examples, electrical stimulation may also include anti-tachycardia pacing (ATP) therapy. Processing circuitry 120 may control signal generator circuitry 124 to deliver electrical stimulation therapy according to one or more atrial therapy programs including pacing instructions and values, which may be stored in memory 122.

Sensing circuitry 126 may include circuits that acquire low frequency electrical signals. Low frequency electrical signals acquired by sensing circuitry 126 may include intrinsic cardiac electrical activity, such as intrinsic atrial and/or intrinsic ventricular cardiac electrical activity. Sensing circuitry 126 may amplify, filter, and digitize the acquired electrical signals to generate digital signals. Processing circuitry 120 may receive the digitized signals generated by sensing circuitry 126. In some examples, processing circuitry 120 may perform various digital signal processing operations on the digital signals, such as digital filtering. Processing circuitry may store the resulting representations of the sensed signals 123 in memory 122.

Processing circuitry 120 may sense cardiac events based on the data received from sensing circuitry 126. For example, processing circuitry 120 may sense atrial events based on the data received from sensing circuitry 126. In some examples, processing circuitry 120 may sense ventricular activation based on the data received from sensing circuitry 126. For example, processing circuitry 120 may detect FFRWs indicative of ventricular activation based on the data received from sensing circuitry 126.

Sensor 130 may comprise at least one of a variety of different sensors. For example, sensor 130 may comprise at least one of a pressure sensor and an accelerometer. Sensor 130 may generate signals that indicate at least one of an activity level of patient 102 or a hemodynamic pressure. Processing circuitry 120 may detect, for example, an activity level of patient 102 or a hemodynamic pressure based on the signals generated by sensor 130.

Communication circuitry 128 may include any suitable hardware (e.g., an antenna), firmware, software, or any combination thereof for communicating with another device, such as programmer 114 or a patient monitor. Under the control of processing circuitry 120, communication circuitry 128 may receive downlink telemetry from and send uplink telemetry to other devices, such as programmer 114 (FIG. 3) or a patient monitor, with the aid of an antenna included in communication circuitry 128.

Programmer 114 may be a handheld computing device, desktop computing device, a networked computing device, etc. Programmer 114 may include a computer-readable storage medium having instructions that cause a processor of programmer 114 to provide the functions attributed to programmer 114 in the present disclosure. Atrial device may wirelessly communicate with programmer 114. For example, atrial device 100 may transfer data to programmer 114 and may receive data from programmer 114. Programmer 114 may also wirelessly program and/or wirelessly charge atrial device 100.

Data retrieved from atrial device 100 using programmer 114 may include cardiac EGMs stored by atrial device 100 that indicate electrical activity of heart 106 or other sensed signals and marker channel data that indicates the occurrence and timing of sensing, diagnosis, and therapy events associated with atrial device 100. Data transferred to atrial device 100 using programmer 114 may include, for example, operational programs for atrial device 100 that cause atrial device 100 to operate as described herein.

Figure 4:
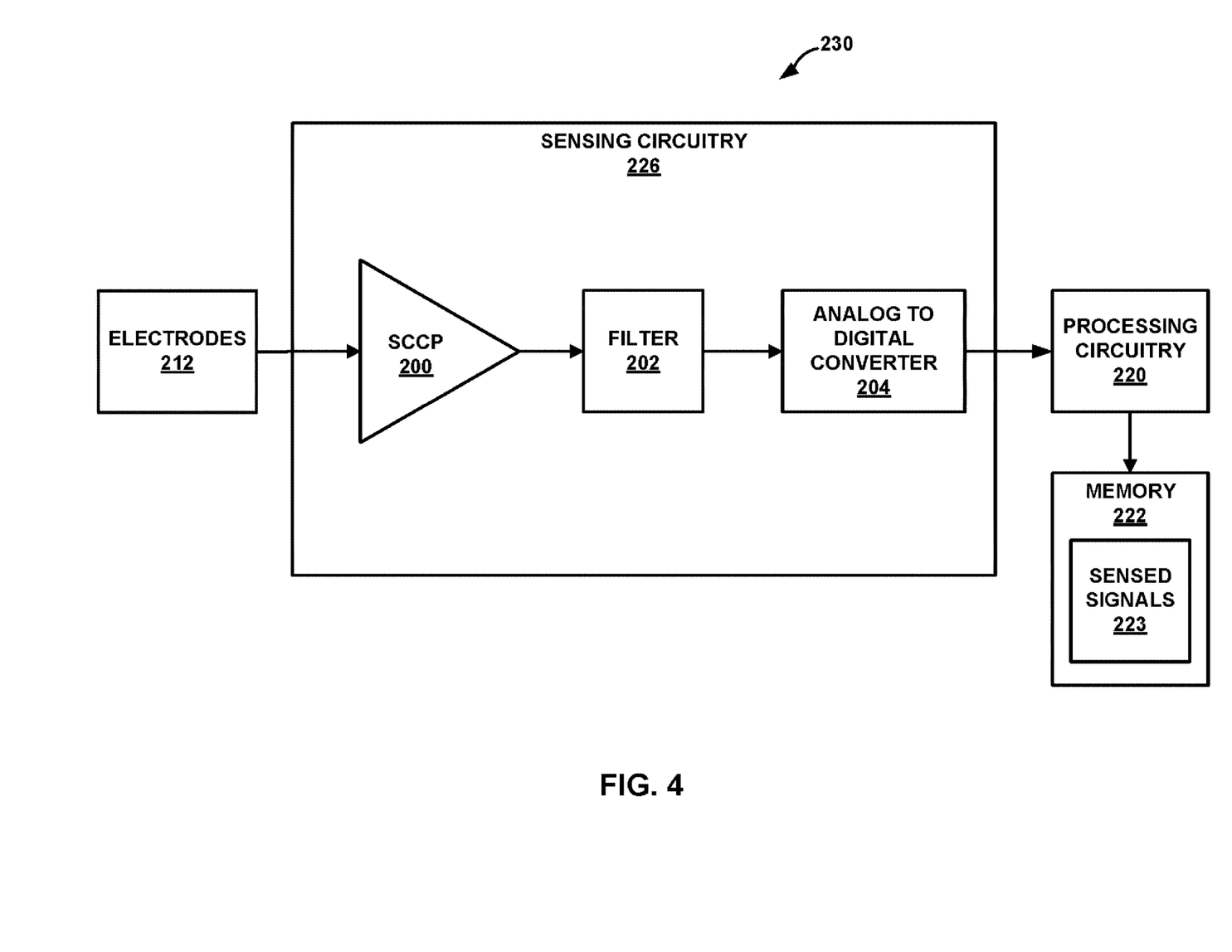
FIG. 4 is a block diagram illustrating an example device having sensing circuitry according to the techniques of this disclosure.

FIG. 4 is a block diagram illustrating an example device having sensing circuitry according to the techniques of this disclosure. Device 230 may include memory 222 configured to store representations of sensed signals 223. Device 230 may include processing circuitry 220 coupled to memory 222. Processing circuitry 220 may be configured to read or write the representations of the sensed signals 223 in memory 222. Device 230 may include sensing circuitry 226 coupled to processing circuitry 220. In some examples, sensing circuitry 226 may be configured to sense signals indicative of a physiological condition of a patient via a plurality of electrodes (e.g., electrodes 212). In some examples, sensing circuitry 226 may be configured to sense low frequency signals via a plurality of electrodes (e.g., electrodes 212). Sensing circuitry 226 may also be configured to output to processor circuitry 220 representations of the sensed signals (e.g., representations of the sensed signals 223). Sensing circuitry 226 may include a switched capacitor charge pump (e.g., SCCP 200) configured to amplify the sensed signals to generate amplified signals. In some examples, the sensed signals may be cardiac signals.

Electrodes 212 are electrically coupled to sensing circuitry 226. In some examples, electrodes 212 may be examples of electrodes 112 (FIG. 2). In other examples, electrodes 212 may be electrically coupled to leads which may be electrically coupled to sensing circuitry 226. Sensing circuitry 226 may be an example of sensing circuitry 126 of FIG. 2. Processing circuitry 220 may also be electrically coupled to sensing circuitry 226. Processing circuitry 220 may be an example of processing circuitry 120 (FIG. 2).

Sensing circuitry 226 may include a switched capacitance charge pump (SCCP 200). SCCP 200 may be electrically coupled to electrodes 212 and may be configured to increase a voltage received from electrodes 212. SCCP 200 may include a plurality of passive devices, e.g., capacitors, and a plurality of passive switches. In some examples, SCCP 200 may include an all series-parallel topology of capacitors and passive switches. In some examples, SCCP 200 may include a Fibonacci series charge pump. In some examples, the Fibonacci series charge pump may include two or more stages. In some examples, SCCP 200 may be configured to operate without a fixed bias current. For example, SCCP 200 may be configured to provide gain to the sensed signals, effectively lowering the noise floor, without adding excess current which may more quickly drain a battery powering a device, such as atrial device 100. For example, SCCP 200 may refrain from using a constant bias current. In this manner, sensing circuitry 226 may limit current consumption of the sensing pathway in an implantable medical device. Sensing circuitry 226 may drain a battery, such as power source 132 (FIG. 2), less quickly than sensing circuitry having an active preamplifier and may lead to longer battery life than sensing circuitry having an active preamplifier. In this manner, the current consumption of the gain stage is limited to passive switching currents, thereby decreasing battery drain.

In some examples, SCCP 200 may transfer charge from the input signal (e.g., from electrodes 212) to capacitors with passive switches in a manner that multiplies the input voltage. By using passive switches, the current consumption is limited to only the dynamic switching currents. By using this topology for the sensed signal amplification, the current consumption may be reduced on the order of about 75% compared to using an active preamplifier and may reduce area occupied by SCCP 200 compared to an active preamplifier on the order of 45%-50%.

In some examples, SCCP 200 is configured such that the gain increases as a Fibonacci sequence with an increasing number of stages. For example, with one switched capacitor stage, SCCP 200 has a theoretical gain of 2. With two stages, SCCP 200 has a theoretical gain of 3. With three stages, SCCP 200 has a theoretical gain of 5. With four stages, SCCP 200 has a theoretical gain of 8. As the number of stages in SCCP 200 increases, the theoretical gain continues to increase in a Fibonacci sequence. SCCP 200 may be configured to switching capacitors in parallel and in series with one another, so that the nth stage is charged to the output voltage of the (n−1) stage.

A switched capacitor charge pump having a Fibonacci topology may be less parasitic-dependent than other topologies, such as an all series-parallel topology. The use of Fibonacci topology may be useful for relatively low frequency sensing pathways, such as those in an IMD (e.g., atrial device 100) because the bandpass response of SCCP 200 may be limited at relatively higher frequencies.

Sensing circuitry 226 may include filter 202 coupled to the switched capacitor charge pump (e.g., SCCP 200). Filter 202 may be configured to filter the amplified signals. The output of SCCP 200 may be filtered by filter 202. For example, filter 202 may smooth the output of SCCP 200 to prepare the sensed signals for analog to digital conversion.

Sensing circuitry 226 may include analog to digital converter 204 coupled to the switched capacitor charge pump. In some examples, analog to digital converter 204 may be coupled to the switched capacitor charge pump (e.g., SCCP 200) through filter 202. Analog to digital converter 204 may be configured to convert the amplified signals (which may include filtered signals) into digital signals.

The output of filter 202 may be converted from an analog signal to a digital signal by analog to digital converter 204. In some examples, processing circuitry 220 may perform various digital signal processing operations on the output of sensing circuitry 226, such as digital filtering. Processing circuitry 220 may also store representations of the sensed signals 223 in memory 222. Memory 222 may be an example of memory 122 of FIG. 2. The representations of sensed signals 223 stored in memory 222 may be amplified, filtered and analog to digital converted representations of the sensed signals. In some examples, the representations of sensed signals 223 may be amplified, filtered, analog to digital converted and digitally signal processed representations of the sensed signals.

Figure 5:
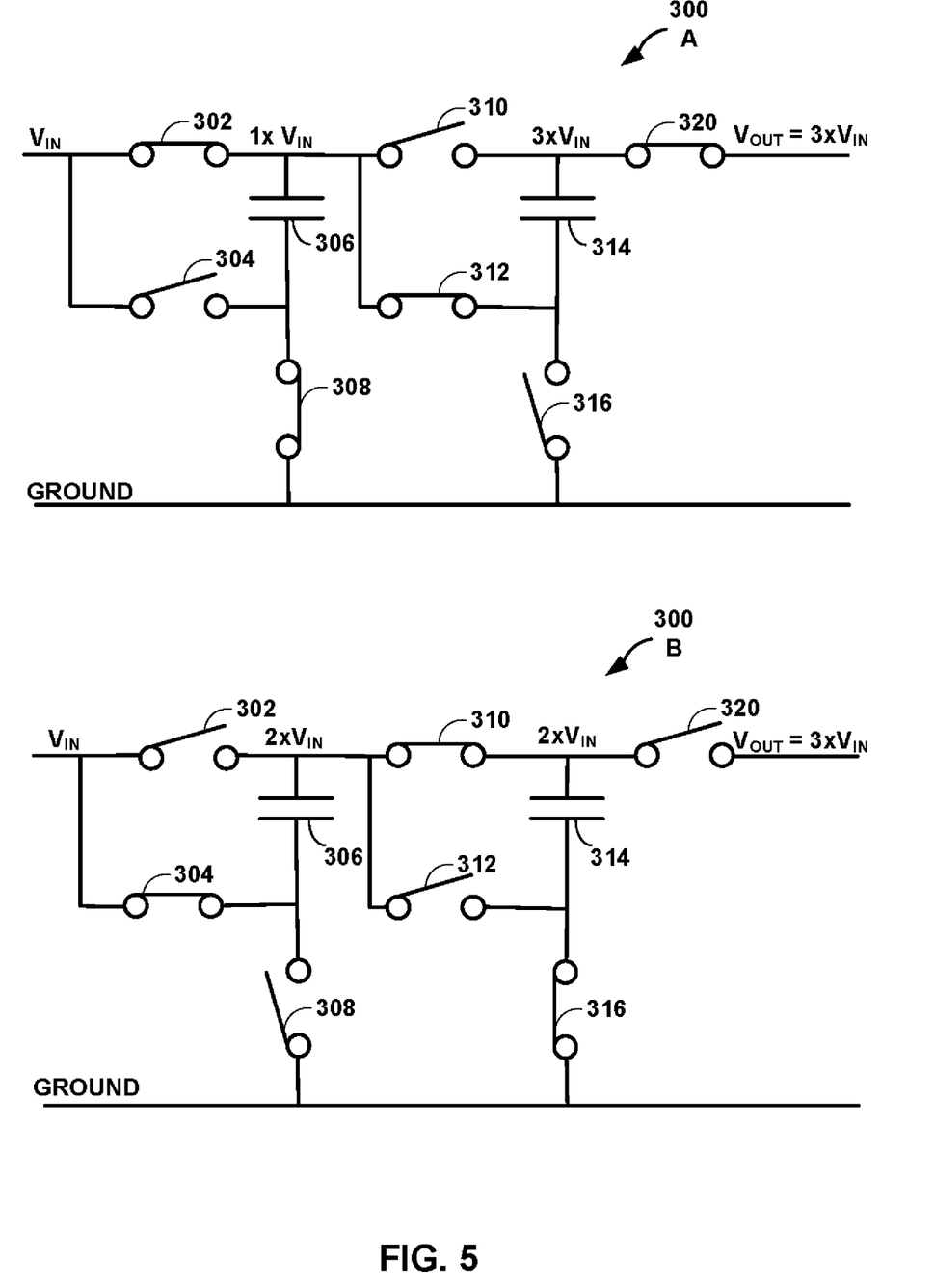
FIG. 5 is a conceptual diagram illustrating example states of a two stage Fibonacci series switched capacitance charge pump according to the techniques of this disclosure.

FIG. 5 is a conceptual diagram illustrating example states of a two stage Fibonacci series switched capacitance charge pump according to the techniques of this disclosure. The Fibonacci series switched capacitance charge pump of FIG. 5 may be an example of SCCP 200 of FIG. 4. The two stage Fibonacci series switched capacitance charge pump of FIG. 5 operates by charging the voltage of the nth capacitor to the output voltage of the (n−1)th capacitor. The charge on the nth capacitor is then added to the output voltage of the (n−2)th capacitor and connected to the input of the (n+1)th capacitor, resulting in a Fibonacci pattern for the gain per stage. For example, the charge pump would provide a theoretical gain of 2V/V with one capacitor stage, a theoretical gain of 3V/V with two capacitor stages, a theoretical gain of 5V/V with three capacitor stages, a theoretical gain of 8V/V with four capacitor stages, etc. The Fibonacci topology requires fewer stages for the same amount of gain compared to a series-parallel topology for charge pump capacitors. Another benefit to using the Fibonacci topology is that the Fibonacci topology may result in less parasitic losses compared to other topologies.

In first state 300A, switch 302 is closed permitting current to flow between $V_{IN}$ and the top side of capacitor 306. Therefore, the voltage at the top side of capacitor 306 is also $V_{IN}$ (or $1\times V_{IN}$). Switch 304 is open and therefore not electrically coupled to the bottom side of capacitor 306. Switch 308 is coupled to ground and is closed. So the voltage at the bottom side of the capacitor is equal to the voltage at ground.

Also, in first state 300A, switch 310 is open, so $1\times V_{IN}$ is not electrically coupled to the top side of capacitor 314. Switch 316 is open, so ground is not electrically coupled to the bottom of capacitor 314. Instead, switch 312 is closed, electrically coupling the bottom side of capacitor 314 to $1\times V_{IN}$. This causes a built up charge on capacitor 314 (e.g., $2\times V_{IN}$) to raise the voltage at the top side of capacitor 314 to $3\times V_{IN}$. As switch 320 is closed, electrically coupling $3\times V_{IN}$ to VOUT, VOUT theoretically equals $3\times V_{IN}$.

In second state 300B, switch 302 is open, electrically decoupling $V_{IN}$ from the top of capacitor 306. Switch 308 is also open, electrically decoupling ground from the bottom of capacitor 306. Instead, switch 304 is closed, electrically coupling $V_{IN}$ to the bottom of capacitor 306. This causes a built-up charge on capacitor 306 (e.g., $V_{IN}$) to be added to $V_{IN}$ theoretically bringing the voltage at the top side of capacitor 306 to $2\times V_{IN}$.

Switch 310 is closed, electrically coupling the $2\times V_{IN}$ to the top side of capacitor 314. Switch 312 is open, electrically decoupling the $2\times V_{IN}$ from the bottom side of capacitor 314. Switch 316 is closed, electrically coupling the ground to the bottom side of capacitor 314. Switch 320 is open, electrically decoupling VOUT from the $2\times V_{IN}$. Thus, theoretically the output voltage remains at $3\times V_{IN}$.

The Fibonacci series switched capacitance charge pump of FIG. 5 may move repeatedly between first state 300A and second state 300B to raise the voltage of VOUT as described. It should be noted that no circuit is one hundred percent efficient. With the Fibonacci series switched capacitance charge pump of FIG. 5 VOUT may be on the order of $2.7\times V_{IN}$ rather than the theoretical $3\times V_{IN}$. While the example of FIG. 5 is a two-stage Fibonacci series switched capacitance charge pump, any number of stages may be used in accordance with the techniques of this disclosure. The Fibonacci series switched capacitance charge pump of FIG. 5 may be a low-noise circuit and also reduce the noise contribution from the sensing circuitry (e.g., sensing circuitry 226).

A Fibonacci series switched capacitor charge pump, such as that of the example of FIG. 5, may be well suited for devices having a relatively small lead or electrode polarization. A Fibonacci series switched capacitor charge pump, such as that of the example of FIG. 5, may be well suited for pseudo-differential devices. A Fibonacci series switched capacitor charge pump, such as that of the example of FIG. 5, may be well suited for low sensitivity devices. In some examples, a Fibonacci series switched capacitor charge pump, such as that of the example of FIG. 5, may consume less than 30 nA of current, achieve an overall gain of on the order of 2.7V/V, and have on the order of 8 u Vrms input-referred noise.

Figure 6:
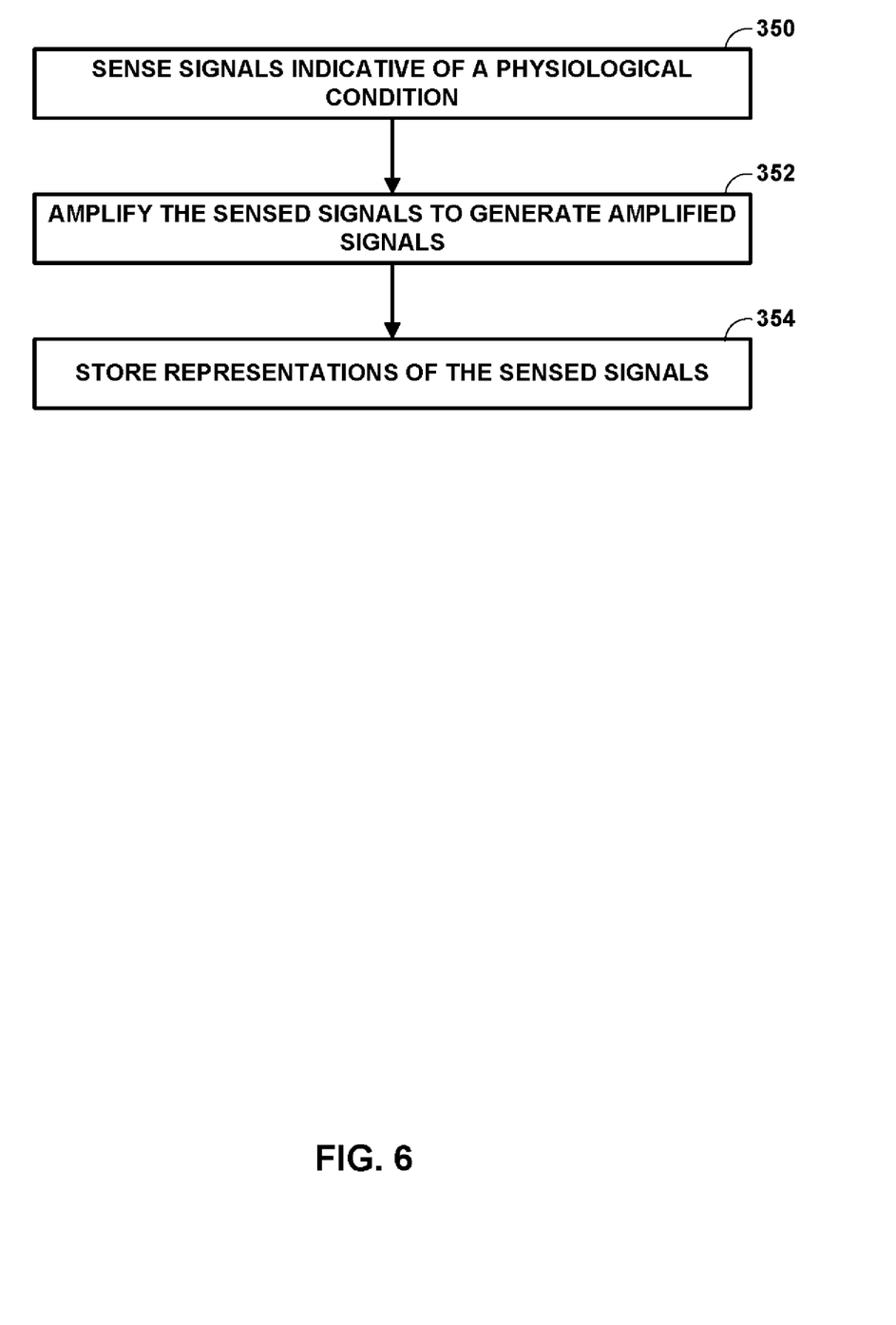
FIG. 6 is a flowchart illustrating example techniques of sensing signals indicative of a physiological condition of a patient according to the present disclosure.

FIG. 6 is a flowchart illustrating example techniques of sensing signals indicative of a physiological condition of a patient according to the present disclosure. A device may sense, via electrodes, signals indicative of a physiological condition of a patient (350). For example, atrial device 100 may sense, via electrodes 112, signals indicative of a cardiac condition of the patent (e.g., cardiac signals). A switched capacitor charge pump may amplify the sensed signals to generate amplified signals (352). For example, SCCP 200 may amplify the sensed cardiac signals to generate amplified signals. By amplifying the sensed cardiac signals, SCCP 200 may improve the reliability of the sensed signals when compared to not amplifying the sensed signals or when compared to amplifying the sensed signals with an active pre-amplifier. Processing circuitry may store representations of the sensed signals in a memory (354). For example, processing circuitry 120 or processing circuitry 220 may store representations of the sensed signals in memory 122 or memory 222, respectively.

The representations of the sensed signals may be amplified, filtered and analog to digital converted versions of the sensed signals. For example, filter 202 may filter the amplified signals to generate filtered signals. For example, an analog to digital converter may the filtered signals into digital signals. These digital signals may be representations of the sensed signals. In some examples, the representations of the sensed signals may be further digitally signal processed by processing circuitry 120 or processing circuitry 220 before being stored in memory 122 or memory 222, respectively.

In some examples, SCCP 200 may comprise a plurality of passive devices and a plurality of passive switches. In some examples, SCCP 200 may refrain from operating with a fixed bias current. In some examples, SCCP 200 may include a Fibonacci series charge pump. In some examples, the Fibonacci series charge pump includes two or more stages. In some examples, the techniques of FIG. 6 are performed by an IMD. In some examples, the techniques of FIG. 6 are performed by a pacing device and the sensed signals include cardiac signals.

By utilizing a switched capacitor charge pump in sensing circuitry, a device that senses low frequency signals, such as signals indicative of a physiological condition of a patient, may reduce battery drain, increase battery life and lower noise generated by the sensing circuitry when compared to utilizing an active preamplifier. This may lead to the device more reliably sensing the low frequency signals and less frequently needing to be recharged or replaced.

This disclosure includes the following examples.

Example 1

A device comprising: memory configured to store representations of sensed signals; processing circuitry coupled to the memory, the processing circuitry being configured to read or write the representations of the sensed signals in the memory; and sensing circuitry coupled to the processing circuitry, the sensing circuitry being configured to sense signals indicative of a physiological condition of a patient via a plurality of electrodes and to output to the processor circuitry the representations of the sensed signals, wherein the sensing circuitry comprises a switched capacitor charge pump configured to amplify the sensed signals to generate amplified signals.

Example 2

The device of example 1, wherein the switched capacitor charge pump comprises a plurality of passive devices and a plurality of passive switches.

Example 3

The device of any combination of examples 1-2, wherein the switched capacitor charge pump is configured to operate without a fixed bias current.

Example 4

The device of any combination of examples 1-3, wherein the switched capacitor charge pump comprises a Fibonacci series charge pump.

Example 5

The device of example 4, wherein the Fibonacci series charge pump comprises two or more stages.

Example 6

The device of any combination of examples 1-5, wherein the sensing circuitry further comprises a filter coupled to the switched capacitor charge pump, the filter configured to filter at least one of the sensed signals or the amplified signals.

Example 7

The device of any combination of examples 1-6, further comprising: an analog to digital converter coupled to the switched capacitor charge pump, the analog to digital converter being configured to convert the amplified signals into digital signals.

Example 8

The device of any combination of examples 1-7, wherein the device comprises a pacing device and the sensed signals comprise cardiac signals.

Example 9

The device of any combination of examples 1-8, wherein the device comprises an implantable medical device.

Example 10

A method comprising: sensing, via electrodes, signals indicative of a physiological condition of a patient; amplifying, by a switched capacitor charge pump, the signals indicative of the physiological condition of the patient to generate amplified signals; and storing, by processing circuitry, representations of the sensed signals in a memory.

Example 11

The method of example 10, wherein the switched capacitor charge pump comprises a plurality of passive devices and a plurality of passive switches.

Example 12

The method of any combination of examples 10-11, further comprising refraining, by the switched capacitor charge pump, from operating with a fixed bias current.

Example 13

The method of any combination of examples 10-12, wherein the switched capacitor charge pump comprises a Fibonacci series charge pump.

Example 14

The method of example 13, wherein the Fibonacci series charge pump comprises two or more stages.

Example 15

The method of any combination of examples 10-14, further comprising filtering, by a filter, at least one of the sensed signals or the amplified signals.

Example 16

The method of any combination of examples 10-15, further comprising converting, by an analog to digital converter, the amplified signals into digital signals.

Example 17

The method of any combination of examples 10-16, wherein the method is performed by an implantable medical device.

Example 18

The method of any combination of examples 10-17, wherein the method is performed by a pacing device and wherein the sensed signals comprise cardiac signals.

Example 19

A device comprising: memory configured to store representations of sensed signals; processing circuitry coupled to the memory, the processing circuitry being configured to read or write the representations of the sensed signals in the memory; and sensing circuitry coupled to the processing circuitry, the sensing circuitry being configured to sense low frequency signals via a plurality of electrodes and to output to the processor circuitry the representations of the sensed signals, wherein the sensing circuitry comprises a switched capacitor charge pump configured to amplify the sensed signals to generate amplified signals.

Example 20

The device of example 20, wherein the low frequency signals comprise cardiac signals.

Various examples have been described. These and other examples are within the scope of the following claims.

What is claimed is:

1. A device comprising:
   memory configured to store representations of sensed physiological signals;
   processing circuitry coupled to the memory, the processing circuitry being configured to read or write the representations of the sensed physiological signals in the memory; and
   sensing circuitry coupled to the processing circuitry, the sensing circuitry being configured to sense physiological signals, the physiological signals indicative of a physiological condition of a patient via a plurality of electrodes, and to output to the processing circuitry the representations of the sensed physiological signals, wherein the sensing circuitry comprises a switched capacitor charge pump configured to amplify the sensed physiological signals to generate amplified physiological signals, wherein the switched capacitor charge pump:
   is configured to operate without a fixed bias current; and
   comprises a Fibonacci series charge pump.

2. The device of claim 1, wherein the switched capacitor charge pump comprises a plurality of passive devices and a plurality of passive switches.

3. The device of claim 1, wherein the Fibonacci series charge pump comprises two or more stages.

4. The device of claim 1, wherein the sensing circuitry further comprises a filter coupled to the switched capacitor charge pump, the filter configured to filter the amplified physiological signals.

5. The device of claim 1, further comprising:
   an analog to digital converter coupled to the switched capacitor charge pump, the analog to digital converter being configured to convert the amplified physiological signals into digital physiological signals.

6. The device of claim 1, wherein the device comprises a pacing device and the sensed physiological signals comprise cardiac signals.

7. The device of claim 1, wherein the device comprises an implantable medical device.

8. A method comprising:
   sensing, via electrodes, physiological signals indicative of a physiological condition of a patient;
   amplifying, by a switched capacitor charge pump, the physiological signals indicative of the physiological condition of the patient to generate amplified physiological signals, wherein the switched capacitor charge pump:
   refrains from operating with a fixed bias current; and
   comprises a Fibonacci series charge pump; and
   storing, by processing circuitry, representations of the sensed physiological signals in a memory.

9. The method of claim 8, wherein the switched capacitor charge pump comprises a plurality of passive devices and a plurality of passive switches.

10. The method of claim 8, wherein the Fibonacci series charge pump comprises two or more stages.

11. The method of claim 8, further comprising filtering, by a filter, at least one of the sensed physiological signals or the amplified physiological signals.

12. The method of claim 8, further comprising converting, by an analog to digital converter, the amplified physiological signals into digital physiological signals.

13. The method of claim 8, wherein the method is performed by an implantable medical device.

14. The method of claim 8, wherein the method is performed by a pacing device and wherein the sensed physiological signals comprise cardiac signals.

15. A device comprising:
   memory configured to store representations of sensed low frequency physiological signals;
   processing circuitry coupled to the memory, the processing circuitry being configured to read or write the representations of the sensed physiological signals in the memory; and
   sensing circuitry coupled to the processing circuitry, the sensing circuitry being configured to sense low frequency physiological signals via a plurality of electrodes and to output to the processing circuitry the representations of the sensed low frequency physiological signals, wherein the sensing circuitry comprises a switched capacitor charge pump configured to amplify the sensed low frequency physiological signals to generate amplified low frequency physiological signals, wherein the switched capacitor charge pump:
   is configured to operate without a fixed bias current; and
   comprises a Fibonacci series charge pump.

16. The device of claim 15, wherein the low frequency physiological signals comprise cardiac signals.

* * * * *